United States Patent Office

3,140,250
Patented July 7, 1964

3,140,250
MANUFACTURE OF SILICA-ZIRCONIA-
ALUMINA CATALYST
Robert H. Cramer and Sylvander C. Eastwood, Woodbury, and Abbott F. Houser, Delaware Township, Camden County, N.J., assignors to Socony Mobil Oil Company, Inc., a corporation of New York
No Drawing. Filed Mar. 13, 1961, Ser. No. 95,011
18 Claims. (Cl. 208—120)

This invention relates to a method of preparation of a silica-zirconia-alumina catalyst having improved properties. More particularly, this invention relates to a method for producing a solid porous silica-zirconia-alumina catalyst, which catalyst may be used for the catalytic conversion of hydrocarbons to thereby produce improved yields and a more desirable product distribution than that generally obtained when using the usual catalysts of the prior art.

Many operations for the conversion of hydrocarbon materials are carried out in the presence of inorganic oxide gels, which gels exert a catalytic effect upon the hydrocarbons. Such inorganic oxide gels are generally prepared by the formation of a sol of a desired composition, which sol will set to form a hydrogel after a lapse of a suitable period of time. The resulting hydrogel is washed to remove impurities and then dried to remove the liquid phase therefrom. Typical solid porous catalysts of this type include gels of silica, alumina, zirconia, molybdena, and the like. Such gels frequently comprise a cogel of two or more inorganic oxides, for example, silica-alumina, silica-zirconia, silica-alumina-zirconia, silica-alumina-chromia, and the like.

Of the present commercially available catalysts, a synthetic silica-alumina catalyst is by far the most widely used. While such a type of catalyst is in many ways superior to the previously employed clay catalysts and is satisfactory in many respects, it is somewhat lacking in certain attributes that are desirable in a present day catalytic cracking catalyst. In particular, efforts have been made to increase the yield of gasoline obtainable by the use of such silica-alumina catalysts, which yield, although appreciable, is not so high as has been desired.

In addition, modern catalytic cracking processes require a catalyst which is not only specifically active in the chemical reactions which are to be catalyzed but also possesses physical characteristics required for commercially successful operation. One of the important physical attributes of a commercial catalyst is hardness, i.e., the ability to resist attrition. The ability of a particle to hold its shape in withstanding the mechanical handling to which it is subjected upon storage, shipment and use is therefore a significant requirement for a successful cracking catalyst. Catalytic cracking operations in which heavy petroleum fractions are converted to lighter materials boiling in the range of gasoline are carried out in the presence of a solid porous catalyst and generally a composite of silica-alumina which may contain a minor proportion of one or more added metals or metal oxides. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous catalyst having the ability to withstand abrasion during the various handling operations during conversion and regeneration is therefore most desirable.

Another important physical attribute of a modern-day cracking catalyst is its diffusivity. The diffusivity of a catalyst is a measured property which characterizes the ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units, carbon burning capacity of the regenerator is the primary limiting factor on conversion capacity for the unit and on conversion level per pass. It is accordingly desirable to increase carbon burning capacity by improving the carbon burning rate for the spent catalysts.

One inorganic oxide gel that has received particular attention is silica-alumina into which has been incorporated a certain proportion of fines. These fines are a solid powdered material that is insoluble in the initial hydrosol so that they retain their discrete character in the resultant hydrogel. It has been found that the incorporation of such fines into the oxide gel results in a catalyst having improved attrition resistance and improved hardness. U.S. Patent 2,900,349 describes in considerable detail the preparation of such fines-containing catalysts. The addition of high density fines to any catalyst will increase the catalyst density and will also improve the catalyst attrition resistance and diffusivity. The increase in density will permit greater hydrocarbon throughput in moving bed units. The increased attriton resistance will result in lower catalyst makeup rates. Higher diffusivities result in a catalyst having a faster coke burning rate.

Although such fines-containing catalysts do offer improved attrition resistance to hardness, when used in conjunction with a hydrocarbon charge it has been found that the resultant gasoline yield and comparatively low yields of dry gas and coke, nevertheless could be improved upon.

Three component oxide gels, e.g., silica-zirconia-alumina, frequently have been used for catalytic hydrocarbon treatments. A number of methods for the preparation of this type of catalyst have been described. Typically, a silica gel is prepared by acidifying a solution of sodium silicate. Alumina and zirconia are subsequently deposited on the hydrated silica gel to thereby form the three component system. Alternatively, silica may first be treated with an aluminum salt to thereby form a silica-alumina system, and this system is then treated with a zirconium salt to form the desired three component system.

However, such prior art gels are in reality gelatinous precipitates. The intermediate hydrogel state obtained in preparation of the present catalysts and described hereinafter is to be distinguished from such gelatinous precipitates. True all-embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure, they can be formed into high quality spheroidal particles.

It is accordingly one object of our invention to provide a novel method for the preparation of a silica-zirconia-alumina solid porous catalyst.

Another object is to provide a method for the preparation of a solid porous silica-zirconia-alumina catalyst, which catalyst offers considerable advantages when used in conjunction with hydrocarbons, these advantages being reflected in improved gasoline yields and in improved product distribution, particularly as compared to corresponding gasoline yields and product distribution obtained using such catalysts as silica-alumina and fines-containing silica alumina.

Additional objects will become apparent hereinafter.

In accordance with one aspect of our invention, an improved porous catalyst of silica, zirconia and alumina, this catalyst capable of producing improved gasoline yields and improved product distributions from a hydrocarbon stream, is prepared by intimately contacting an aqueous acid zirconium salt solution containing aluminum ions with an aqueous alkali metal silicate solution in such proportions as to form a hydrosol having a pH of from 7 to 10 and to subsequently set to a hydrogel containing from about 73 to 90 percent by weight silica, from about 5 to 15 percent zirconia, and from about 3 to 12 percent alumina, these proportions based on cogelled oxides only, permitting the hydrosol to set to a hydrogel, preferably subjecting the hydrogel to hydrothermal treatment to thereby control the density of the finished catalyst, activating the hydrogel by treatment at an elevated temperature with a low pH solution of either an acid, an aluminum salt, or a combination thereof, scavenging (e.g., treating with an ammonium salt solution) to remove any residual zeolitic alkali therefrom, washing the hydrogel free of soluble matter, and drying the hydrogel.

In accordance with another aspect of our invention, a catalyst of silica, zirconia and alumina possessing all of the aforesaid advantages and also exhibiting unusual attrition resistance and diffusivity is prepared in a similar manner as described previously, however a predetermined proportion of insoluble fines, e.g., alumina fines, are initially incorporated into the alkali metal silicate solution to thereby form a slurry, so that subsequent addition of the acidic zirconium salt solution containing aluminum ions results in the formation of a silica-zirconia-alumina hydrogel containing these fines as an integral part thereof. The fines-containing hydrogel is then treated as previously described, i.e., subjected to a hot activation, scavenged, washed and dried.

We have found that by virtue of the hot activation step, that is, the treatment of the silica-zirconia-alumina hydrogel with an aqueous solution of either (1) an acid such as sulfuric acid, (2) an aluminum salt such as aluminum sulfate, or (3) a combination of an acid and an aluminum salt, the finished catalyst exhibits a selective capacity in cracking hydrocarbons. That is, the cracking results in an increased gasoline yield and in a corresponding decrease in the amount of other fractions produced, so that the overall product distribution is considerably improved. Thus, the silica-zirconia-alumina catalysts made by the method of our invention offer improved gasoline yields and product distribution as compared not only to conventional silica-alumina catalysts but also as compared to prior-art silica-zirconia-alumina catalyst (typically gelatinous precipitates and not hydrogels), such prior art catalysts not having been subjected to a hot activation step.

If desired, the silica-zirconia-alumina hydrogel may, prior to hot activation, be subjected to hydrothermal treatment, i.e., contacted with water at an elevated temperature for a specified period of time. Such treatment affords a convenient means for controlling the density of the finished catalyst. In general, the higher the temperature and the longer the time of treatment, the lower the density of the finished catalyst.

As stated earlier, the two forming solutions, that is, the alkali metal silicate solution and the acidic zirconium salt solution, such as sulfato-zirconic acid solution containing aluminum ions, are mixed in such proportions that they will result in a hydrogel having a silica content of from about 75 to 90 percent, a zirconia content of from about 5 to 15 percent by weight, and alumina content of from about 5 to 10 percent by weight, based on the cogelled oxides only. The pH during the forming of the hydrogel should be between about 7 and 10. A more preferred pH range is from 8 to 9.

If the hydrogel is subjected to a hydrothermal treatment, such treatment is desirably carried out at a temperature of from about 70 to 200° F., or more preferably from about 70 to 150° F., for a period of from about 6 to 24 hours.

When it is desired to produce a fines-containing catalyst by the method of our invention, it is preferred that the fines material be a "high density" material that is insoluble in the hydrosol and is infusible at the temperature of calcination of the hydrogel. A high density material is defined herein as one wherein the particle density is in excess of 2.5 grams per cubic centimeter. Particle density is computed on the basis of the total volume of the particle including pores therewithin. It is to be distinguished from skeletal density, which is computed solely on the basis of the actual volume occupied by the catalyst material per se and excludes pore space. The subsequent examples illustrate the use of alumina fines, however, other suitable high density materials include barytes, zircon, dead burned clay, bauxite, or other fines that do not adversely affect the catalytic properties may be used. In general, those fines materials disclosed in U.S. Patent 2,900,349 and having a particle density in excess of 2.5 grams per cubic centimeter are suitable high density materials.

Where it is desired to incorporate fines into the catalyst, finely divided calcined alpha alumina may desirably be employed as a fines material. It is composed of alpha alumina which has undergone calcination at a temperature in excess of 2000° F. such that the surface area normally present at low temperature is largely destroyed. Alcoa A-2 Alumina has been found to be a very effective form of alumina. A-2 Alumina is characterized by a hexagonal crystalline structure and has the following properties.

Chemical analysis, percent:
- $Al_2O_3$ -------------------------------- 99
- $Na_2O$ -------------------------------- 0.50
- $Fe_2O_3$ -------------------------------- 0.04
- $SiO_2$ -------------------------------- 0.025
- Loss on ignition 1100° C_____ 0.30
- Water adsorbed at 50% humidity_____ 0.10
- Alpha alumina content, percent_____ 90+

Physical properties:
- Bulk density, packed, lb./ft.$^3$_____ 68
- Bulk density, loose, lb./ft.$^3$_____ 52
- Specific gravity_____ 3.7–3.9
- Surface area, m.$^2$/g_____ 0.4
- Pore volume, ml./g_____ 0.25
- Pore diameter, A_____ 15,000

While the incorporation of high density fines into the catalyst constitutes one preferred embodiment of our invention, it will be understood that our invention also finds application wherein "ordinary" lower-density fines are incorporated into the catalyst. Typical lower-density fines materials include recycle catalyst fines, uncalcined clay, and the like. Other lower-density fines materials include those disclosed in U.S. Patent 2,900,349 and having a particle density less than about 2.5 grams per cubic centimeter.

Of course, the optimum fines size and concentration will vary depending upon the particular material used. In general, however, the particle size of the fines should be from about 2 to 7 microns weight mean particle diameter. The fines are desirably incorporated in the sodium silicate solution to thereby form a sodium silicate slurry.

The particle size distribution of the fines introduced into the hydrosol in accordance with the present process was determined by sedimentation methods. The weight mean particle diameters were determined by plotting the cumulative percent of fines, smaller than a given diameter against particle diameter, dividing the total size range into a number of small fractions and calculating as follows:

$$\text{Weight mean diameter} = \frac{\sum d_i g_i}{\sum g_i}$$

wherein $d_i$ is the mean particle size of the fraction in microns and $g_i$ is the corresponding weight percent material in the fraction.

If fines are incorporated into the hydrogel, it is essential in order to achieve the desired characteristics of density, high diffusivity and high resistance to attrition that the particle size of the fines incorporated in the gel be within the approximate range of 2 to 7 microns in weight mean particle diameter. A more preferred range is from 4 to 6 microns. It is also desirable, in order to achieve the above desired catalyst characteristics, that the amount of fines incorporated into the gel be within the approximate range of 20 to 60 percent by weight. A more preferred range is from 40 to 50 percent by weight.

The solution employed for the hot activation step may contain either an aluminum salt, an acid, or both. If an aluminum salt is used it may be any of the readily available water soluble normal salts such as, for example, aluminum chloride, aluminum nitrate, aluminum sulfate, and the like. If an acid is also contained in such solution it is generally, but not necessarily, characterized by the same acid anion as the aluminum salt employed. Thus, an acidic aluminum salt solution of aluminum sulfate containing sulfuric acid has been found to afford highly satisfactory results in manufacture of the present catalyst. Where an aqueous acid solution is used (without an aluminum salt), any of the usual mineral acids are suitable, e.g., HCl, $H_2SO_4$, $HNO_3$, etc. The pH of the hot activation solution must be no higher than 7, and preferably from zero to 4.

Activation of the hydrogel is carried out using a hot solution, preferably maintained at a temperature between about 125° and 200° F. A more preferred temperature range is from about 150° to 200° F. If the solution is solely an aqueous acid solution, it preferably contains from 1 to 5 percent acid and from 95 to 99 percent water. If the solution consists of an aqueous aluminum salt, it desirably contains from 0.5 to 10 percent aluminum salt and from 90 to 99.5 percent water. A more preferred range is from 1 to 5 percent aluminum salt and from 95 to 99 percent water. If an aqueous solution of both an acid and aluminum salt is used, the preferred ranges are for each component from 0.5 to 2.5 percent salt, from 0.5 to 2.5 percent acid, and from 95 to 99 percent water.

The time required for the activation of the hydrogel with the hot solution may vary within wide limits, i.e., from as little as one hour up to about 24 hours. More preferably, the treating time is from about 5 to 12 hours. If the activation solution consists of an aqueous acid the time for this treatment is desirably from 3 to 24 hours, or more preferably from about 5 to 8 hours. The preferred temperature range for the aqueous acid is from about 175° to 200° F. If a solution consisting of an aqueous aluminum salt is used, the treating time is desirably from 1 to 24 hours, or more preferably from about 8 to 12 hours, and the solution temperature is from about 150° to 200° F. If a solution containing both an acid and an aluminum salt is used, the treating time may be from 1 to 24 hours, or more preferably from 5 to 8 hours, and the preferred temperature of the solution is from about 150° to 200° F.

The hot activation of the hydrogel is a critical step, for without such hot activation the finished catalyst does not exhibit all of the desirable attributes obtainable by the catalysts of the instant invention. Thus, without such hot activation step the resulting catalyst does not produce higher yields and improved product distribution, which desirable results do occur when the hot activation step is included.

The alkali metal silicate reactant employed in the preparation of the present catalysts is generally sodium silicate but it is contemplated that other alkali metal silicates such as potassium silicate may, likewise, be used.

The aqueous acidic zirconium salt solution, preferably sulfatozirconic acid solution containing aluminum ions employed as another of the reactants is conveniently prepared by adding appropriate quantities of sulfuric acid, zirconium sulfate, and aluminum sulfate to water. Of course, other soluble zirconium salts may be substituted for zirconium sulfate, such as zirconium halides, zirconium nitrate, zirconium carboxylates (e.g., acetate), and the like. Other acids and particularly other mineral acids may be substituted for sulfuric acid. Similarly, any of the usual soluble aluminum salts previously mentioned may be substituted for aluminum sulfate. The aluminum may even be provided in the form of sodium aluminate. However, in this latter case the salt must be dissolved in the sodium silicate solution and must be of such a nature and concentration as to not cause the silicate to form a gel prior to its admixture with the sulfatozirconic acid solution. Suitable complexing agents may be employed to prevent gelation of the basic solution prior to its admixture with the sulfatozirconic acid solution. Typical complexing agents include citric acid, glycolic acid and the like.

After activation the hydrogel is scavenged with a suitable aqueous solution to remove any zeolitic alkali introduced into the hydrogel from the silicate solution and not removed by hot activation. The hydrogel may be base-exchanged with a suitable aqueous solution containing an ion capable of replacing zeolitic alkali metal, which ion does not detrimentally affect the finished catalyst. Thus, the base exchange solution employed may affect replacement of the zeolitic alkali metal without involving the introduction of an additional metal or metal compound in the hydrogel, such as treatment with a solution of an aluminum salt, an ammonium salt or an acid. By using a base exchange solution or a metal salt other than a metal already contained in the hydrogel, it is possible to introduce quantities of an additional metal oxide into the gel composite. The incorporation of such additional metal oxide into the hydrogel may desirably act as a catalytic promoter under particular reaction conditions.

An aqueous solution of an ammonium salt, e.g. ammonium sulfate, has been found to be quite satisfactory for scavenge. The scavenge may be carried out at room temperature or at temperatures up to about 200° F. where an aqueous solution of an ammonium salt, e.g., ammonium sulfate, is used such a solution should contain from about 0.05 to 1 weight percent of ammonium sulfate. The treatment with the base exchange solution may vary from about one half hour up to 36 hours. More preferably, the treatment may be from about one half hour up to 24 hours.

While as described herein the hot activation step and the scavenge step are carried out successively, if desired these two steps can be combined into a single operation. In commercial production such a combination offers obvious economical advantages.

The hydrogel product after scavenge is water washed free of soluble matter. The washed hydrogel is then dried, suitably in an atmosphere of super heated steam, at a temperature of about 150° F. to about 400° F. The dried product is thereafter calcined for from 1 to 24 hours, suitably in an atmosphere of air and/or steam, at a temperature or from about 1100 to 1600° F. A more preferred range for calcining is from about 1200° to 1450° F. There results an attrition resistant catalyst capable of producing improved gasoline yields from hydrocarbons.

The finished catalyst composition may vary within considerable limits. If a fines-containing catalyst is prepared, the amount of fines present may be from about 20 to 60 weight percent, with the amount of gel phase present correspondingly from 80 to 40 percent. The composition of the gel phase comprise from 5 to 15 percent zirconia, from 3 to 12 percent alumina, and from 73 to 92 percent silica. A more preferred range comprises from 40 to 50 percent fines and from 60 to 50 percent gel phase. A preferred gel phase composition comprises from 5 to 10 percent zirconia, from 4 to 7 percent alumina, and from 83 to 91 percent silica.

The process described herein may be employed in the preparation of a silica-zirconia-alumina cracking catalyst in any desired physical form. Thus, the hydrosol may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also the hydrosol may be introduced into the perforations of a perforated plate and retained therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing hydrosol into a column of water-immiscible liquid, for example, an oil medium wherein globules of hydrosol are formed and set to spheroidal bead-like particles of hydrogel. Larger size spheres are ordinarily within the range of from about $\frac{1}{64}$ to about $\frac{1}{2}$ inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-zirconia-alumina cracking catalyst particles are subjected to continuous movement. As applied to the stationary bed, spheroidal gel catalyst particles provided effective contact between the reactants and the catalyst by avoiding channeling.

It is accordingly one embodiment of the present invention to prepare the described attrition-resistant silica-zirconia-alumina catalyst in the form of spheres although it is to be realized that the method hereinafter set forth may also be employed in obtaining a mass of gel which may thereafter be broken up into particles of desired size. Likewise, the method described herein may be used in the preparation of silica-zirconia-alumina cracking catalysts in the form of particles of any other desired size or shape.

Steam stability of the catalyst prepared in accordance with the method described herein was determined by an accelerated test which simulates the conditions encountered during the catalyst use. In this test, the catalyst is contacted with 100 percent steam at 1200° F. and 15 p.s.i.g. pressure for 10 hours and the cracking activity is then determined and compared with the cracking activity of fresh, unsteamed catalyst. The results thus obtained are indicative of the stability of the catalyst.

The cracking activity of the catalyst is a measure of its capacity to catalyze conversion of hydrocarbons and is expressed herein as the percentage conversion of a Mid-Continent Gas Oil having a boiling range of 450 to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations. The catalyst described herein is desirably characterized by a conversion, at equilibrium, determined on the above basis within the approximate range of 45 to 60.

The diffusivity of the catalyst is a measure of the ability of fluids to diffuse therethrough and is determined by measuring the rate at which hydrogen under a constant partial pressure, at essentially atmospheric conditions, will pass through a single catalyst particle having a size of 5 to 6 mesh (Tyler). The diffusivity is the average of such determinations on fifteen particles and is expressed as cubic centimeters of hydrogen per centimeter at catalyst per second $\times 10^{-3}$. The catalyst described herein is desirably characterized by a diffusivity determined on the above basis of at least 10 and generally within the range of 15 to 30.

The term "apparent density" as utilized herein refers to the weight as compared with the volume occupied by a packed mass of the catalyst particles. It is determined by weighing a fairly large volume of the catalyst particles. For example, a large diameter graduated cylinder is filled to a volume calibration gently tamped down and the weight of the particles determined by difference in weight of the graduate before and after filling with the particles. The catalyst of the present invention, in one embodiment, i.e., when containing fines of high density as described hereinabove, is characterized by an apparent density of at least 0.9 gram per cubic centimeter.

The attrition characteristics of the catalysts prepared in accordance with the method described herein were determined by an attrition test known as the Lauson Shaker Attrition (LSA) Test. The procedure used in the test consists of shaking a 50 cc. sample of the product to be tested in a closed steel cup which is bolted to the piston of a motor-driven Lauson Engine which operates at 1000 r.p.m. After shaking for a time sufficient to produce 10 weight percent fines, capable of passing through an 8 mesh (Tyler) screen, the sample is screened, weighed, and the percentage loss is calculated. These operations are repeated until slightly more than half the sample has been reduced to fines. Cumulative losses are plotted against total shaking time. The cumulative time in seconds for 50 percent weight of fines is read from the curve and is reported as the Lauson Shaker Attrition. Since the LSA of gels is affected by the size of the particles tested, the attrition data reported herein correspond to that of particles having an average particle diameter of 0.140 inch to avoid the interferences of these variables in correlating the effect of quantity and size of added material on attrition. The catalyst described herein is characterized by a LSA attrition resistance of at least 1000 seconds.

In accordance with a further aspect of our invention, we have found that when the gel time of the hydrosol is increased this permits bead formation at higher metal oxide and product concentration than is ordinarily possible. Product concentration as utilized herein refers at constant fines concentration to the total content of gel oxide product solids present in the freshly formed hydrogel multiplied by 100 and divided by the sum of the total gel oxide solids and water contained in the hydrogel. Mathematically, product concentration ($pc$) may be expressed as follows:

$$pc = \frac{\text{gel oxides}}{\text{gel oxides} + \text{water}} \times 100$$

The gel time is increased considerably if excess acid is added to the sulfatorzirconic acid solution containing aluminum ions while at the same time adding an equivalent amount of sodium hydroxide to the silicate solution. The above effect of free acid in increasing gel time is clearly shown by the data given in Table 1 hereinafter. It will be noted that the addition of excess sulfuric acid increased the gel time from 10 seconds to 40 seconds.

TABLE I

*Effect of Free Acid on Gel Time*

$SiO_2$—$ZrO_2$—$Al_2O_3$

Solution Compositions

| | | |
|---|---|---|
| Sulfatozirconic Acid-Aluminum Sulfate Solution: | | |
| $H_2O$, percent wt | 91.98 | 90.70 |
| $ZrO_2$, percent wt | 0.81 | 0.80 |
| $Al_2(SO_4)_3$, percent wt | 5.70 | 5.62 |
| $H_2SO_4$, percent wt | 1.41 | 2.78 |
| Total gms. sol'n | 234 | 238 |
| Silicate Solution: | | |
| N-Brand Silicate, percent wt | 44.48 | 44.03 |
| NaOH, percent wt | 0.73 | 1.73 |
| $H_2O$, percent wt | 54.79 | 54.24 |
| Total gms. of Solution | 262 | 264 |
| Dilution $H_2O$, gms. Hydrogel Composition: | | |
| $ZrO_2$, percent wt | 5.1 | 5.1 |
| $Al_2O_3$, percent wt | 10.1 | 10.1 |
| $SiO_2$, percent wt | 84.8 | 84.8 |
| Gel Temp. °F | 55 | 50 |
| Gel Time secs | 10 | 40 |

The presence of the dilution water (990 grams shown in Table I) serves to increase the gel time. Thus, where the gel is formed in a column in the absence of the dilution water, the gel time is considerably reduced, e.g., at 53° F. the gel time is 4.4 seconds.

In accordance with another aspect of our invention, we have found that if the total sulfate ion content in the sulfatozirconic acid forming solution is increased, the whole bead content is considerably increased. In order to maintain the pH within the desired range when excess sulfuric acid has been added to the sulfatozirconic acid forming solution, an equivalent amount of an alkali such as sodium hydroxide is added to the silicate forming solution. We prefer that the weight ratio of sulfuric acid to the silica, zirconia, and alumina in the freshly formed hydrogel be from about 0.35 to 0.75. A still more preferred range is from about 0.55 to 0.65.

EXAMPLE 1

This example illustrates the use of the method of our invention to prepare a fines-containing silica-zirconia-alumina catalyst. A silica-zirconia-alumina gel was prepared by mixing streams comprising (1) an aqueous sulfatozirconic acid solution containing aluminum ions and (2) an aqueous sodium silicate slurry containing fines. The aqueous sulfatozirconic acid solution was 88.95 percent water, 2.05 percent zirconia, 5.56 percent sulfuric acid, and 3.44 percent aluminum sulfate. This solution had a specific gravity at 60° F. of 1.0955 and a solution rate of 422 cubic centimeters per minute. The sodium silicate slurry consisted of 50.57 percent sodium silicate (N-brand), 11.91 percent alumina fines (Alcoa A–2), 1.29 percent sodium hydroxide, and 36.23 percent water. This slurry had a specific gravity at 75° F. of 1.326 and a solution rate of 434 cubic centimeters per minute. The size of the alumina fines was 4.6/3.2 microns, $dw/ds$ ($dw$=weight mean particle diameter; $ds$=surface mean particle diameter).

These two streams were brought together in such proportions that the resulting pH was 8.5. There resulted a hydrogel. The gel time was 2.9 seconds at a temperature of 54° F. The ratio of acid to oxides, i.e., the ratio of the total amount of sulfate ions present to the weight of silica plus zirconia plus alumina, as formed, was 0.42. The hydrogel was hydrothermally treated for 8 hours with water at 85° F.

The hydrogel was subjected to activation by treating with a three percent acid alum solution consisting of 2.25 percent aluminum sulfate, 0.75 percent sulfuric acid, and 97 percent water. The treatment was carried out for 8 hours at a temperature of 200° F.

The hydrogel was then treated with an aqueous solution of 0.1 percent ammonium sulfate for twelve one-hour exchanges at room temperature to thereby scavenge the hydrogel and remove any remaining zeolitic sodium therefrom. The hydrogel was water washed, dried, and then subjected for five hours to calcination at a temperature of 1400° F. and an air rate of 3 volumes of air per volume of catalyst per minute (3 v./v./min.). The resulting catalyst had an apparent density of 0.90 gram per cubic centimeter, an average particle diameter of 0.149 inch, and was 98 percent whole beads. Its Lauson Shaker Attrition was 1100 and its diffusivity was $36.8 \times 10^3$ square centimeters per second. The catalyst was then subjected to an accelerated aging test by treatment for 10 hours with steam at 1200° F. and at 15 p.s.i.g. pressure. The steam-treated catalyst had an apparent density of 0.96 gram per cubic centimeter.

The finished catalyst consisted of 41.2 percent calcined alumina fines, 50 percent silica, 4.2 percent alumina, and 4.6 percent zirconia (Table II). The resultant yield and product distribution obtained at the same when using a commercial 90% silica–10% alumina catalyst is given in Table II. It will be noted that the fines-containing silica-zirconia-alumina catalyst produced a higher gasoline yield than that of the silica-alumina catalyst, i.e., 39.0 percent compared to 36.8 percent (39.0–2.2), and also produced lower dry gas and coke yields, i.e., 6.4 percent compared to 7.2 percent (6.4+0.8) dry gas yield and 2.9 percent compared to 3.8 percent (2.9+0.9) coke yield.

EXAMPLES 2–4

The procedure as outlined in Example 1 was repeated, however, the composition of the forming streams was varied in each instance, as shown in Table II. The final catalyst composition, yields and product distributions obtained therefrom, and comparisons of such yields and product distributions with those obtained at the same conversions from commercial fines-containing silica-alumina catalysts are given in Table II. In each instance

TABLE II

*Physical and Chemical Properties of $SiO_2$—$ZrO_2$—$Al_2O_3$*

| Forming | Ex 1 | Ex 2 | Ex 3 | Ex 4 | Ex 5 |
|---|---|---|---|---|---|
| pH | 8.5 | 8.5 | 8.5 | 8.5 | 8.4 |
| Zirconium Sulfate Solution: | | | | | |
|   $H_2O$, percent wt | 88.95 | 94.15 | 90.70 | 89.30 | 92.01 |
|   $ZrO_2$, percent wt | 2.05 | 0.68 | 0.84 | 1.43 | 0.93 |
|   $H_2SO_4$, percent wt | 5.56 | 2.89 | 2.84 | 4.47 | 3.94 |
|   $Al_2(SO_4)_3$, percent wt | 3.44 | 2.28 | 5.62 | 4.80 | 3.12 |
|   Sp. gr. at 60° F | 1.0955 | 1.053 | 1.086 | 1.0965 | 1.068 |
|   Solution Rate, cc./min | 422 | 452 | 392 | 382 | 480 |
| Silicate Solution: | | | | | |
|   N-Brand, percent wt | 50.57 | 52.46 | 39.55 | 35.11 | 60 |
|   Fines, percent wt | 11.91 | 11.75 | 9.31 | 8.76 | |
|   NaOH, percent wt | 1.29 | | 1.56 | 2.38 | |
|   $H_2O$, percent wt | 36.23 | 35.79 | 49.58 | 53.75 | 40 |
|   Sp. gr. at 75° F | 1.326 | 1.310 | 1.252 | 1.236 | 1.211 |
|   Solution Rate, cc./min | 434 | 312 | 425 | 385 | 415 |
| Type Fines | Alumina | Alumina | Alumina | Alumina | |
| Fines Size Microns, dw/ds | 4.6/3.2 | 4.6/3.2 | 4.6/3.2 | 4.6/3.2 | |
| Gel Time, sec./temp. ° F | 2.9/54 | 4.0/50 | 4.0/49 | 5.1/48 | 3.2/48 |
| Acid/Oxides wt. Ratio [1] | 0.42 | 0.38 | 0.42 | 0.60 | 0.31 |
| Hydrogel Processing: | | | | | |
|   Hot Water Treat, hrs./temp. ° F | 8/85 | 8/85 | 8/85 | 8/85 | 3/120 |
| Activation: | | | | | |
|   $Al_2(SO_4)_3$, percent wt | 2.25 | 2.25 | 2.25 | 2.25 | |
|   $H_2SO_4$, percent wt | 0.75 | 0.75 | 0.75 | 0.75 | 3.0 |
|   No. Batches | 1 | 1 | 1 | 1 | 1 |
|   Hrs./Batch | 8 | 8 | 8 | 8 | 3 |
|   Temp., ° F | 200 | 200 | 200 | 200 | 200 |
| Scavenge: | | | | | |
|   $(NH_4)_2SO_4$, percent wt | 0.1 | 0.1 | 0.1 | 0.1 | 2 |
|   No. Batches | 12 | 12 | 12 | 12 | 8 |
|   Hrs./Batch | 1 | 1 | 1 | 1 | 2 |
|   Temp., ° F | Rm. temp. | Rm. temp. | Rm. temp. | Rm. temp. | Rm. temp. |
| Calcination: | | | | | |
|   Time, hrs | 5 | 5 | 5 | 5 | 5 |
|   Temp., ° F | 1,400 | 1,400 | 1,400 | 1,400 | 1,400 |
|   Air Rate, v./v./min | 3 | 3 | 3 | 3 | 3 |
| Properties After Tempering: | | | | | |
|   Apparent Density, g./cc | 0.90 | 0.87 | 0.90 | 0.93 | |
|   Ave. part. dia., in. [4-7 Mesh (Tyler)] | 0.149 | 0.145 | 0.147 | 0.143 | |
|   Whole Beads, percent wt | 98 | 99 | 99 | 99 | 52 |
|   LSA 50% CORR. to 0.140 APD | 1,100 | 1,600 | 2,350 | 4,000 | |
|   Diffusivity (cm.$^2$/sec.)×10$^3$ | 36.8 | 38.2 | 31.2 | 22.1 | |
| Catalyst Treatment: | | | | | |
|   Time, hrs | 10 | 10 | 10 | 10 | 10 |
|   Temperature, ° F | 1,200 | 1,200 | 1,200 | 1,200 | 1,200 |
|   Percent Steam | 100 | 100 | 100 | 100 | 100 |
|   Pressure, p.s.i.g. | 15 | 15 | 15 | 15 | 15 |
| Physical Properties: | | | | | |
|   Apparent Density, gm./cc | 0.96 | 0.91 | 0.94 | 0.97 | 0.84 |
| Composition, Finished Catalyst: | | | | | |
|   $ZrO_2$, percent wt | 4.6 | 2.3 | 2.4 | 4.3 | 5.2 |
|   $Al_2O_3$, percent wt | 4.2 | 4.2 | 7.3 | 7.3 | 2.6 |
|   $SiO_2$, percent wt | 50.0 | 52.1 | 49.2 | 46.9 | 92.2 |
|   Calcined $Al_2O_3$ Fines, percent wt | 41.2 | 4.14 | 41.1 | 41.0 | |
| Gas Oil Cracking Yields: | | | | | |
|   Conversion, percent vol | 54.3 | 47.3 | 52.2 | 54.1 | 49.1 |

| | Ex 1 | | Ex 2 | | Ex 3 | | Ex 4 | | Ex 5 | |
|---|---|---|---|---|---|---|---|---|---|---|
| | | Δ$^2$ | | Δ$^2$ | | Δ$^2$ | | Δ$^2$ | | Δ$^2$ |
| Gasoline, $C_4$-Free, percent vol | 39.0 | +2.2 | 36.1 | +2.5 | 37.1 | +1.1 | 38.1 | +1.4 | 36.5 | +2.1 |
| Total $C_4$'s, percent vol | 17.5 | −0.1 | 13.7 | −1.0 | 16.5 | −0.3 | 17.2 | −0.3 | 13.1 | −1.5 |
| Dry Gas, percent wt | 6.4 | −0.8 | 5.0 | −1.0 | 6.4 | −0.4 | 6.3 | −0.8 | 5.5 | −0.5 |
| Coke, percent wt | 2.9 | −0.9 | 2.2 | −0.7 | 3.0 | −0.5 | 3.2 | −0.5 | 2.7 | −0.4 |
| Hydrogen, percent wt | 0.05 | −0.01 | 0.00 | −0.04 | 0.05 | −0.01 | 0.05 | −0.01 | 0.02 | −0.03 |

[1] Acid/oxides = Total ($SO_4$) = as $H_2SO_4$ to ($SiO_2$+$ZrO_2$+$Al_2O_3$) wt. Ratio as formed.
[2] Δ Yields = Catalyst gas oil cracking yields less $SiO_2$—$Al_2O_3$(90%$SiO_2$—10% $Al_2O_3$) catalyst yields at same conversion level.

it will be seen that the use of fines-containing silica-zirconia-alumina catalysts made by the method of our invention results in improved gasoline yields and reduced dry gas and coke yields.

EXAMPLE 5

This example illustrates the applicability of the method of our invention to the production of a homogeneous silica-alumina-zirconia catalyst (containing no fines). The procedure was essentially as that described in Example 1, however, the sodium silicate solution used did not contain any fines or any sodium hydroxide. The compositions of the forming streams, treatment, final catalyst composition, and comparison of catalyst yield with that of a commercial silica-alumina catalyst is given in Table II. The improved gasoline yield and reduced dry gas and coke yields are evident.

The process of our invention is not limited to the specific silica-zirconia-alumina system primarily described. Thus, salts of other polyvalent metals than aluminum may be substituted to prepare silica-zirconia-third component catalysts. For example, chromia, molybdena, or titania might be substituted for alumina as third component.

The silica-zirconia-alumina catalysts produced by the method of our invention may, if desired, also contain other components. For example, the controlled addition of chromina may be effected if it is desired to increase the coke burning rate of the catalyst. Such addition would also serve to prevent afterburning, and yet would not adversely affect the cracking properties of the catalyst.

Our silica-zirconia-alumina catalysts also may be used as a support for an additional metal, metal oxide, or sulfide. For example, such a catalyst system is a very good support for such metals as platinum, palladium, and rhodium, as well as for oxides and sulfides of such metals as cobalt, molybdenum, tungsten and nickel. Such supported catalysts find application in hydrocracking, reforming and the like.

Further, our type of silica-zirconia-alumina catalyst serves as a good support for an oxidation catalyst such as, e.g., oxides of chromium, nickel, iron, copper, vanadium, manganese, platinum, or the like.

Variations can, of course, be made without departing from the spirit of this invention.

Having thus described our invention, what we desire to secure and claim by Letters Patent is:

1. A method of preparing a solid porous catalyst of silica-zirconia-alumina which comprises mixing an aqueous solution of an alkali metal silicate with an aqueous solution of a zirconium salt and an aluminum salt, said mixing carried out with such proportions of said solutions as to result in a hydrosol having a pH of from 7 to 10 and to subsequently set to a hydrogel containing from 5 to 15% $ZrO_2$, from 5 to 10% $Al_2O_3$, and from 75 to 90% $SiO_2$ based on co-gelled oxides only, permitting said hydrosol to set to a hydrogel, activating said hydrogel by treatment for from 1 to 24 hours at a temperature of from 125 to 200° F. with an aqueous solution having as the solute therefor a compound selected from the group consisting of a mineral acid, an aluminum salt, and mixtures thereof, said solution having a pH of from 0 to 7, washing said hydrogel free of water-soluble material, drying and calcining.

2. A method of preparing a solid porous catalyst of silica-zirconia-alumina which comprises mixing an aqueous solution of an alkali metal silicate with an aqueous solution of a zirconium salt, an aluminum salt, and a mineral acid, said mixing carried out with such proportions of said solutions as to result in a hydrosol having a pH of from 7 to 10 and to subsequently set to a hydrogel containing from 5 to 15% $ZrO_2$, from 5 to 10% $Al_2O_3$, and from 75 to 90% $SiO_2$ based on co-gelled oxides only, permitting said hydrosol to set to a hydrogel, hydrothermally treating said hydrogel at a temperature of from about 70 to 200° F. for a period of from about 6 to 24 hours, activating said hydrogel by treatment for from 1 to 24 hours at a temperature of from 125 to 200° F. with an aqueous solution having as the solute therefor a compound selected from the group consisting of a mineral acid, an aluminum salt, and mixtures thereof, said solution having a pH of from 0 to 7, scavenging said hydrogel for from about one half to 36 hours with an aqueous solution containing from about 0.05 to 1 percent by weight of an ammonium salt to induce base exchange and thereby remove any remaining zeolitic alkali therefrom, washing said hydrogel free of water-soluble material, drying and calcining.

3. The method of claim 2 wherein the aqueous solution for said activation consists of from about 1 to 5 percent of a mineral acid and 95 to 99 percent water.

4. The method of claim 2 wherein the aqueous solution for said activation consists of from about 0.5 to 10 percent of an aluminum salt and 90 to 99.5 percent water.

5. The method of claim 2 wherein the aqueous solution for said activation consists of from about 0.5 to 2.5 percent aluminum salt, 0.5 to 2.5 percent mineral acid and 95 to 99 percent water.

6. The method of claim 2 wherein the aluminum salt is aluminum sulfate and the mineral acid is sulfuric acid.

7. A method of preparing a solid porous catalyst of silica-zirconia-alumina which comprises mixing an aqueous solution of sodium silicate with an aqueous solution of a zirconium salt, aluminum sulfate, and sulfuric acid, said mixing being carried out with such proportions of said solutions as to result in a hydrosol having a pH of from 8 to 9 and to subsequently set to a hydrogel containing from 5 to 15% $ZrO_2$, from 5 to 10% $Al_2O_3$, and from 75 to 90% $SiO_2$ based on co-gelled oxides only, the weight ratio of sulfuric acid to co-gelled oxides in said hydrogel being from about 0.35 to 0.75, permitting said hydrosol to set to a hydrogel, hydrothermally treating said hydrogel at a temperature of from about 70 to 200° F. for a period of from about 6 to 24 hours, activating said hydrogel by treatment for from 1 to 24 hours at a temperature of from about 125 to 200° F. with an aqueous solution having as the solute therefor a compound selected from the group consisting of a mineral acid, an aluminum salt, and mixtures thereof, said solution having a pH of from 0 to 5, scavenging said hydrogel for from about one half to 36 hours with an aqueous solution containing from about 0.05 to 1 percent by weight of an ammonium salt to induce base exchange and thereby remove any remaining zeolitic alkali, washing said hydrogel free of water-soluble material, drying and calcining.

8. The method of claim 1 wherein said catalyst is characterized by a high diffusivity and an apparent density of at least 0.9 gram per cubic centimeter and said alkali metal silicate solution contains a predetermined amount of powdered material insoluble in either said silicate solution or in said other aqueous solution and infusible at the temperature of calcination, said powdered material having a weight means particle diameter of from about 2 to 7 microns and being present in said silicate solution in such quantity as to make up from 20 to 60 percent of said finished catalyst.

9. The method of claim 8 wherein the particle density of said fines is in excess of 2.5 grams per cubic centimeter.

10. The method of claim 7 wherein the aqueous solution for said activation consists of from about 1 to 5 percent of a mineral acid and 95 to 99 percent water.

11. The method of cliam 7 wherein the aqueous solution for said activation consists of from about 0.5 to 10 percent of an aluminum salt and 90 to 99.5 percent water.

12. The method of claim 7 wherein the aqueous solution for said activation consists of from about 0.5 to 2.5 percent aluminum salt, 0.5 to 2.5 percent mineral acid and 95 to 99 percent water.

13. The method of claim 7 wherein the aluminum salt is aluminum sulfate and the mineral acid is sulfuric acid.

14. The method of claim 8 wherein the aqueous solution for said activation consists of from about 1 to 5 percent of a mineral aicd and 95 to 99 percent water.

15. The method of claim 8 wherein the aqueous solution for said activation consists of from about 0.5 to 10 percent of an aluminum salt and 90 to 99.5 percent water.

16. The method of claim 8 wherein the aqueous solution for said activation consists of from about 0.5 to 2.5 percent aluminum salt, 0.5 to 2.5 percent mineral acid and 95 to 99 percent water.

17. The method of claim 8 wherein the aluminum salt is aluminum sulfate and the mineral acid is sulfuric acid.

18. A method which comprises mixing an aqueous solution of an alkali metal silicate with an aqueous solution of a zirconium salt and an aluminum salt, said mixing being carried out with such proportions of said solutions as to result in a hydrosol having a pH of from 7 to 10 and to substantially set to a hydrogel containing from 5 to 15 percent $ZrO_2$, from 5 to 10 percent $Al_2O_3$, and from 75 to 90 percent $SiO_2$ based on co-gelled oxides only, permitting said hydrosol to set to a hydrogel, activating said hydrogel by treatment for from 1 to 24 hours at a temperature of from 125 to 200° F. with an aqueous solution having as the solute therefor a compound selected from the group consisting of a mineral acid, an aluminum salt, and mixtures thereof, said solution having a pH of from zero to 7, washing said hydrogel free of water-soluble material, drying and calcining to thereby obtain a solid, porous catalyst of silica-zirconia-alumina, and thereafter contacting said catalyst with a hydrocarbon charge under catalytic cracking conditions to thereby obtain an improved gasoline yield therefrom.

References Cited in the file of this patent

UNITED STATES PATENTS

| | | |
|---|---|---|
| 2,347,648 | Thomas et al. | May 2, 1944 |
| 2,908,635 | Ogorzaly | Oct. 13, 1959 |
| 2,951,815 | Cramer et al. | Sept. 6, 1960 |